Patented Sept. 6, 1938

2,128,944

UNITED STATES PATENT OFFICE 2,128,944

RUBBER COMPOSITION AND METHOD OF PRESERVING RUBBER

Webster N. Jones, Pittsburgh, Pa., assignor to The B. F. Goodrich Company, New York, N. Y., a corporation of New York No Drawing. Original application January 22, 1931, Serial No. 510,514. Divided and this application March 20, 1935, Serial No. 12,041

18 Claims. (Cl. 18—50)

This invention relates to the art of rubber manufacture, and particularly to the preparation of rubber compositions which resist deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

The substances which are employed as anti-oxidants according to this invention are all tertiary aromatic amines containing two amino groups. The preferred compounds are those in which the two amino groups contain both aliphatic and aromatic substituents. The nucleus of the compounds or the external substituents may, however, contain other substantially neutral groupings, such as those of ethers and thioethers. Compounds in which the nitrogen or the oxygen or sulphur form part of a heterocyclic ring have properties differing considerably from those of the compounds of this invention and are not ordinarily designated either as "amines" or as "ethers", hence they are not included within the scope of this invention.

For example, the following symmetrically substituted tertiary amino compounds are typical members of the class of substances outlined above: di-p-phenetyl dimethyl ethylene diamine, diphenyl dimethyl diamino diethyl ether, tetraphenyl diamino diethyl ether, diphenyl dinaphthyl diamino diethyl ether, diphenyl dimethyl diamino diethyl sulphide, tetramethyl diamino diphenyl ether, and tetramethyl diamino diphenyl sulphide. It will be understood, however, that similar unsymmetrical compounds containing two or more tertiary amino groups may likewise be employed with good effect.

The methods employed in the preparation of these substances will be evident to any skilled organic chemist, hence it will not be necessary to refer in detail to the procedure. However, the preparation of these substances may well be illustrated by the fact that many of the substances may be prepared by reacting a secondary aromatic amine with a halogenated organic compound such as a dihalogenated ether.

Any one or a mixture of several of the above-enumerated substances or of other equivalent substances falling within the same class may be incorporated into rubber with good effect on its age-resisting properties. For example, from ¼ to 5% of such an anti-oxidant may be mixed with the rubber before vulcanization, the anti-oxidant having substantially no accelerating effect and therefore ordinarily not necessitating an adjustment of vulcanizing conditions. Alternately the anti-oxidant may be applied to the surface of crude or vulcanized rubber, say in the form of a powder, paste, or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulphur 5.5 parts, zinc oxide 30 parts, gas black 40 parts, mineral rubber 10 parts, palm oil 5 parts, and hexamethylene tetramine 0.75 part. This was divided into portions to one of which was added 0.95 part (0.5% of the weight of the composition) of tetraphenyl diamino diethyl ether. The compositions were thoroughly mixed, and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. The composition containing the anti-oxidant had a tensile strength of 3936 pounds per square inch and ultimate elongation of 723%. After accelerated aging in the Geer oven it still had a strength of 2928 pounds and an elongation of 577%, and after aging in the Bierer-Davis bomb it still had a strength of 2767 pounds and an elongation of 623%. The same rubber composition when vulcanized and tested under the same conditions without the anti-oxidant deteriorated from an original tensile strength of about 3600 pounds per square inch and ultimate elongation of 640% to only 1830 pounds and 435% after 7 days in the Geer oven, and 760 pounds and 335% after 48 hours in the Bierer-Davis bomb.

It is evident from the above example that rubber compositions containing even small proportions of the anti-oxidants of this invention resist deterioration far more effectively than similar untreated compositions. Other anti-oxidants of this class give similar results.

The reason for the effectiveness of the tertiary aromatic amines described above is not well understood. Other similarly constituted substances containing a single tertiary amino group such as dimethyl aniline or dimethyl phenetidine have no appreciable effect on the aging of rubber. It appears, therefore, that the presence of at least two tertiary aromatic amino groups in the molecules of the compounds is essential to the present invention.

Obviously, the practice of this invention is not limited to the specific rubber composition given above, such composition being merely illustrative of one manner of employing the anti-oxidants of this invention. The anti-oxidants may be employed in conjunction with other known anti-oxidants, or with other vulcanizing agents or accelerators than those here specifically disclosed. The proportions of the constituents may be varied, or other substances may be substituted generally therefor, since this invention is applicable to pure rubber or rubber compositions of the most varied nature.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta-percha, rubber isomers and like products, whether or not admixed with fillers, pigments, vulcanizing or accelerating agents.

This application is a division of my co-pending application, Serial No. 510,514, filed January 22, 1931, which has matured into Patent 2,072,596, dated March 2, 1937.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a tertiary aromatic diamine in which the amino groups are attached to different hydrocarbon groups of a compound selected from the class consisting of di-hydrocarbon substituted ethers and thioethers.

2. The method of preserving rubber which comprises treating rubber with a tertiary aromatic diamine in which the amino groups are attached to different hydrocarbon groups of a di-hydrocarbon substituted ether.

3. The method of preserving rubber which comprises treating rubber with a tertiary diamino diaryl ether.

4. The method of preserving rubber which comprises treating rubber with a tetra-alkyl diamino diaryl ether.

5. The method of preserving rubber which comprises treating rubber with a tetra-alkyl diamino diphenyl ether.

6. The method of preserving rubber which comprises treating rubber with tetramethyl diamino diphenyl ether.

7. The method of preserving rubber which comprises treating rubber with an aromatic tertiary diamino dialkyl ether.

8. The method of preserving rubber which comprises treating rubber with a tetra-aryl diamino dialkyl ether.

9. The method of preserving rubber which comprises treating rubber with tetraphenyl diamino diethyl ether.

10. The method of preserving rubber which comprises treating rubber with a tertiary aromatic diamine in which the amino groups are attached to carbon atoms of a thioether.

11. The method of preserving rubber which comprises treating rubber with an aromatic tertiary diamino dialkyl sulphide.

12. The method of preserving rubber which comprises treating rubber with diphenyl dimethyl diamino diethyl sulphide.

13. A rubber composition which has been vulcanized in the presence of a tertiary aromatic diamine in which the amino groups are attached to different hydrocarbon groups of a compound selected from the class consisting of di-hydrocarbon substituted ethers and thioethers.

14. A rubber composition which has been vulcanized in the presence of a tertiary aromatic diamine in which the amino groups are attached to different hydrocarbon groups of a di-hydrocarbon substituted ether.

15. A rubber composition which has been vulcanized in the presence of a tetra-alkyl diamino diaryl ether.

16. A rubber composition which has been vulcanized in the presence of a tetra-aryl diamino dialkyl ether.

17. The method of preserving rubber which comprises treating rubber with a compound having the formula

wherein A and A' represent tertiary aromatic amino groups and X represents oxygen or sulphur.

18. The method of preserving rubber which comprises treating rubber with a compound having the formula

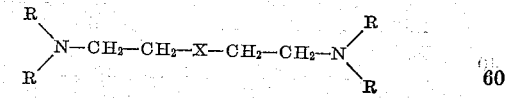

wherein R represents an aryl group and X represents oxygen or sulphur.

WEBSTER N. JONES.